United States Patent [19]
Lesueur et al.

[11] Patent Number: 6,033,124
[45] Date of Patent: Mar. 7, 2000

[54] MULTI-CHANNEL MECHANICAL SPLICING DEVICE FOR FIBER-OPTIC CABLES

[75] Inventors: Philippe Lesueur, Tregastel; Bruno Leguen, Lannion; Christian Liegeois, Soisy sur Seine; Philippe Egon, Pleumeur Bodou, all of France

[73] Assignee: Cables Pirelli, Saint-Maurice, France

[21] Appl. No.: 08/957,860

[22] Filed: Oct. 27, 1997

[30] Foreign Application Priority Data

Oct. 28, 1996 [FR] France ................................. 96 13117

[51] Int. Cl.⁷ ..................................................... G02B 6/36
[52] U.S. Cl. ............................... 385/53; 385/63; 385/71; 385/65; 385/95; 385/98
[58] Field of Search ................................. 385/53, 54, 56, 385/57, 59, 65, 71, 76, 81, 83, 97–99, 63

[56] References Cited

U.S. PATENT DOCUMENTS 5,138,681  8/1992  Larson et al. .............................. 385/95
5,682,450  10/1997  Patterson et al. .......................... 385/65

FOREIGN PATENT DOCUMENTS 0 546 936A  6/1993  European Pat. Off. .
WO 86 01306  2/1986  WIPO .
WO 94 04954  3/1994  WIPO .

OTHER PUBLICATIONS

A. Yasuhiro et al., "Device and Method for Connection of Optical Fiber", Patent abstracts of Japan, 6 (241) ;158 (1982).

*Primary Examiner*—Hemang Sanghavi
*Attorney, Agent, or Firm*—Finnegan, Henderson, Farabow, Garrett & Dunner, L.L.P.

[57] ABSTRACT

The device comprises a central spicing body serving to connect in situ two cable end plugs which fit into the splicing body. The central body has lower rails hollowed out therein and bears lateral shoulders for guiding and locking the end plugs constituted by a lower part and by an upper part fixed to one another by a press fit. The device has application in the in situ splicing of optical fibers.

18 Claims, 4 Drawing Sheets

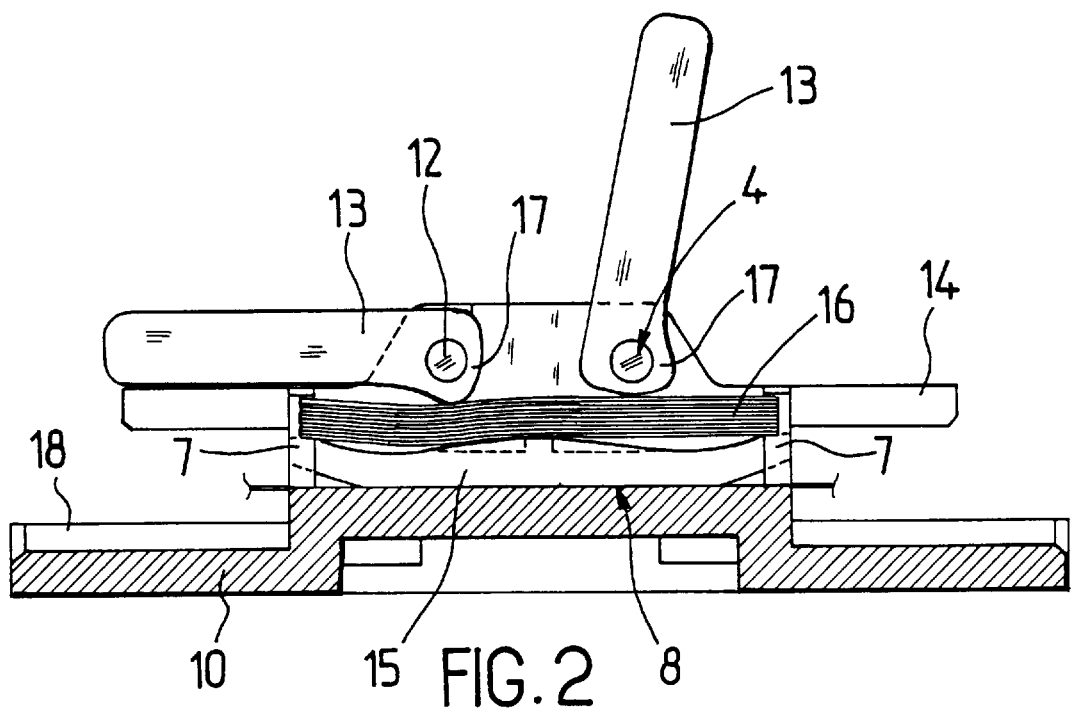
FIG. 2
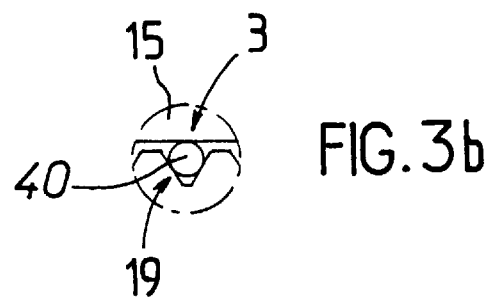
FIG. 3b
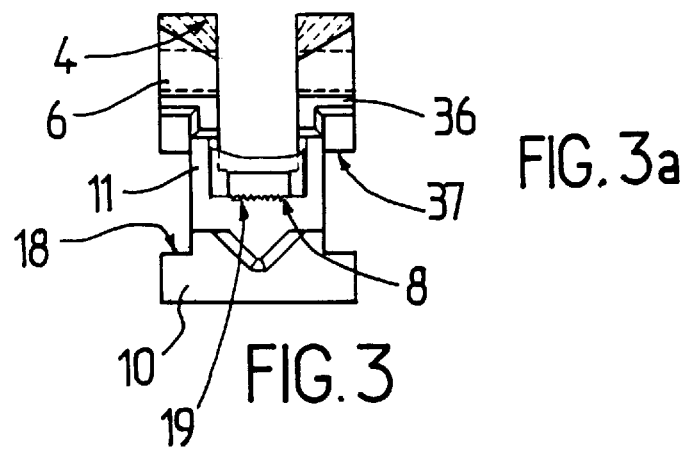
FIG. 3a
FIG. 3

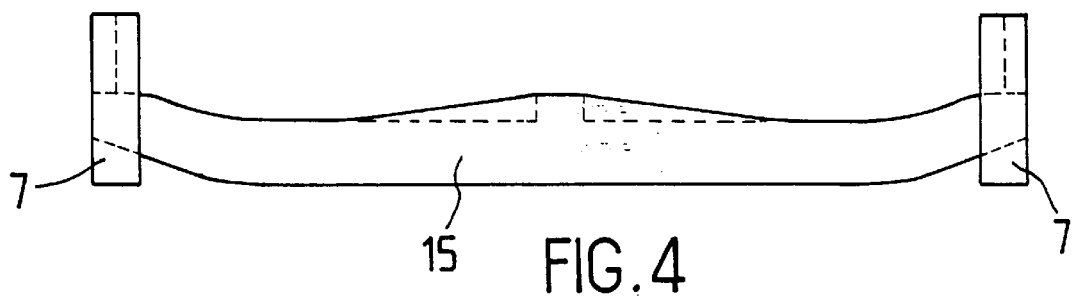
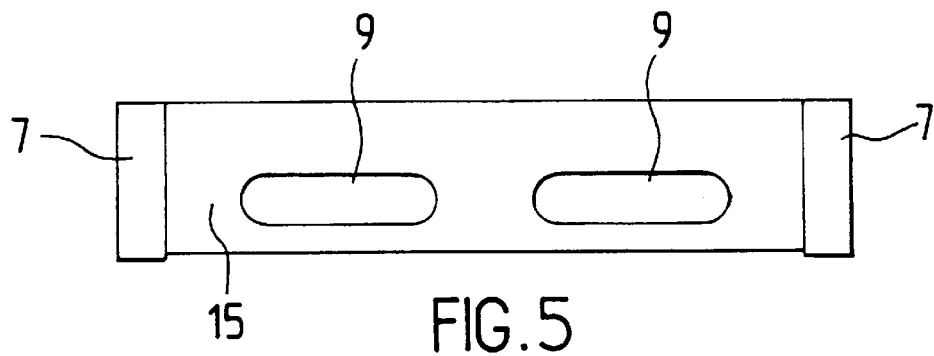
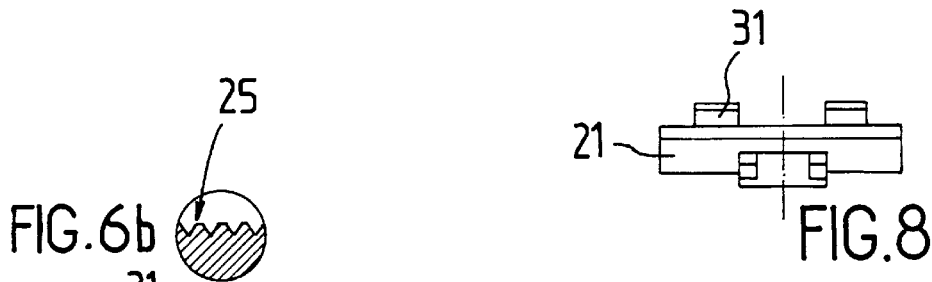
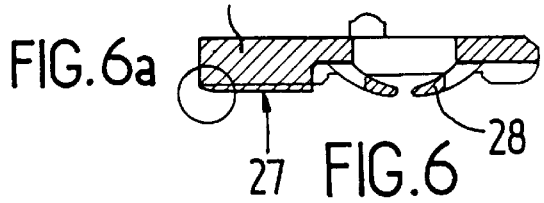
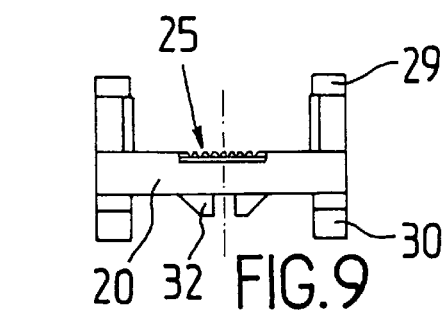
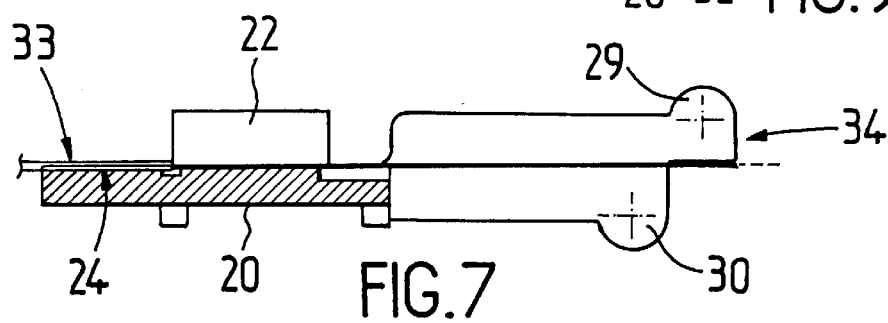

MULTI-CHANNEL MECHANICAL SPLICING DEVICE FOR FIBER-OPTIC CABLES

BACKGROUND OF THE INVENTION

The invention relates to the technical field of fiber-optic cables and, more precisely, to a splicing device that has the advantage of being installable in situ.

Devices for the simultaneous mechanical splicing of several fibers from round or ribbon cables that have to be joined are known in the art. For this purpose, each end of the cable is immobilized in a box or housing in such a way that the bared ends of the optical fibers are held in position before being placed end to end within an assembly body by means of which the splice is made. The said assembly body often takes the form of a tunnel in which the fibers of the two ends to be connected are placed, and by means of which they are clamped. To carry out these operations, it is necessary to have a working surface to which the fibers are brought, as well as suitable equipment on the said working surface for making the necessary splices, which are then located at the point at which they have to be finally installed. Apart from the fact that this equipment necessitates a large number of components and takes up a space that has to be specially set aside for making the splices, it has, above all, the drawback of making it necessary to pull the required length of cable right up to the working surface and then to re-coil up this additional length of cable, the ends of which have been spliced, on the installation site.

It would obviously seem far more advantageous to be able to dispense with this working surface or work bench and its equipment, and to make the requisite splices on their actual site of installation.

SUMMARY OF THE INVENTION

For this purpose, the Applicant has devoted itself to finding a solution that caters for this problem by removing the drawbacks inherent in the known systems.

The invention thus proposes a mechanical splicing device for fiber-optic cables comprising a central splicing body serving to connect in situ two cable end plugs fitting into the said splicing body, the central body being provided with means for guiding and locking the end plugs, as well as with means for positioning the bared fibers, a plate being housed inside the central splicing body and capable of being maneuvered by cams to clamp and hold the bared fibers in the said central body.

According to one preferred embodiment of the device according to the invention, the central body is composed of a base plate bordered by two vertical wings surmounted by a cap having a generally trapezoidal profile, and the tunnel provided between the wings receives the maneuverable plate in contact with the flat bottom of the tunnel.

The maneuverable plate is maneuvered by cams borne by the cap.

According to one particular feature of the invention, the means for guiding and locking the end plugs in the central splicing body are constituted by rails hollowed out in the lateral parts of the base plate, by horizontal lateral shoulders provided at the base of the cap, and by inclined surfaces on horizontal strips that prolong the cap.

Furthermore, the means for positioning the bared fibers in the central splicing body are constituted by V-shaped grooves hollowed out in the lower, flat part of the tunnel provided between the wings.

According to another main feature of the invention, the end plug is composed of a lower part and an upper part fixed to one another by a press fit between the rims or edges of the lower part and cut out portions in the upper part.

BRIEF DESCRIPTION OF THE DRAWINGS

Further particular features and advantages of the invention will emerge from the following description of a non-limitative exemplary form of embodiment in which reference is made to the annexed drawings, which show:

FIGS. 2 and 3a–3b, elevation and end views, respectively, of the central splicing body;

FIGS. 4 and 5, schematic side views of two alternative embodiments of the maneuverable plate;

FIGS. 6a–6b and 8, longitudinal cross-sectional and end views, respectively, of the upper part of the end plug;

FIGS. 7 and 9, longitudinal cross-sectional and end views, respectively, of the lower part of the end plug;

DESCRIPTION OF THE PREFERRED EMBODIMENTS

Figure 1:
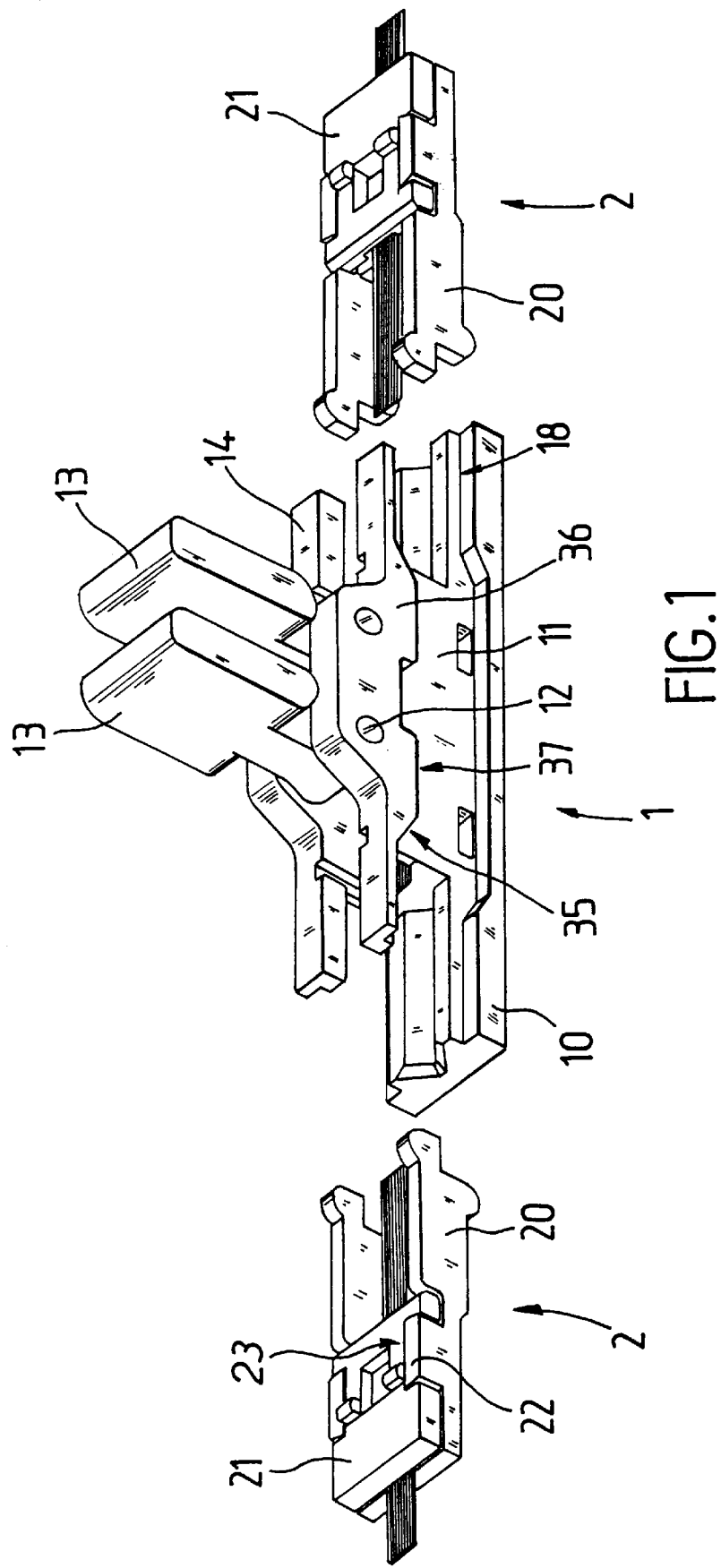
FIG. 1, a perspective exploded view of the mechanical splicing device.

FIG. 1 shows a splicing body, generally designated by reference number 1, as well as two end plugs, generally designated by reference number 2.

Splicing body 1, which is also shown in FIGS. 2 and 3, is composed of a base plate 10 bordered by two vertical wings 11 surmounted by a cap 36 of a generally trapezoidal profile having horizontal lateral shoulders 37 and the top portion of which is pierced by orifices for the passage of two pins 12 on which hinge two cams 13. Cap 36 is prolonged by horizontal strips 14 which extend above plate 10, and the lower faces of which have inclined surfaces 35 orientated downwardly and towards the centre of the splicing body.

Between wings 11 and plate 10 is provided a tunnel inside which is placed a plate 15 on which are stacked a number of metallic strips or leaf springs 16, which are inserted between the plate and the shaped ends 17 of cams 13. End feet 7 of plate 15 come into contact with the flat bottom 8 of the tunnel.

Rails 18 are hollowed out over the entire length of the lateral parts of plate 10, and the lower, flat part 8 of the tunnel is provided with parallel V-shaped grooves 19, which can be seen in FIG. 3b, which shows an enlarged portion of FIG. 3a. The grooves serve to house the bared fibers 40, which are placed under the lower face 3 of plate 15. Upon assembly, cams 13 are inserted into body 1 via the chamfer portion 4, which is present on the pins of the cams and on the splicing body, respectively. Pins 12 of cams 13, which can be metallic pins, are then positioned in holes 6 provided in the lateral walls of cap 36.

FIG. 4 more clearly illustrates the shape of plate 15 introduced between wings 11 of the splicing body. Its lower face is flat, but its upper face curves upwards in its central part in an area in which leaf springs 16 are not subjected to the pressure exerted by the cams.

In the alternative embodiment shown in FIG. 5, plate 15 is no longer fitted with metallic leaf springs but has recesses 9 which permit a certain degree of bending of the plate perpendicularly to the points on which cams 13 bear.

FIGS. 1, 6, 7, 8 and 9 show how an end plug 2 is designed.

The said plug is composed of a lower part 20 and of an upper part 21, which are fixed to one another by a press fit.

The latter is accomplished by a tight fit between rims or edges 22 on part 20 and cut out portions 23 in part 21. The upper face, 24, of lower part 20 and the lower face, 27, of upper part 21 comprise transverse grooves with striations 33 in relief.

Downwardly orientated legs 28 are provided beneath the central area of upper part 21. Above this area are also provided two lateral bosses 31.

Note should be taken of the special profile of lower part 20 of plug 2, the wings of which end in a rounded portion 29 above, and a rounded guide member 30 below and slightly set back to permit the passage of a splitting blade. In addition, the underneath of the said lower part is provided with specially shaped inclined portions 32 permitting lateral positioning of the end plug in the splicing body.

To mechanically splice a plurality of optical fibers using splicing body 1, the first operation is to equip each end of the multi-fiber element or micromodule, or ribbon cable, with an end plug 2. The second operation is to insert the two end plugs, in situ, into the splicing body, and then to close the latter. The end preparation work at each end reduces the free lengths of fibers needed for preparing and making the splices, without any particular working surface being required. Consequently, the re-coiling lengths and the space they take up are also reduced.

To fit the end plug, the ends of the optical fibers are first bared before they are placed on the lower part 20 in such a way that their sheathed portions are placed in striations 33 and that the bared fibers are placed in grooves 25. Upper part 21 is then press fitted onto part 20. Legs 28 then clamp the fibers in grooves 25 (FIG. 6b) and bend until the striations in relief 27 press against the sheathed portion of the cable. The fiber cladding and the bare fibers are thus jointly held in the end plug.

The fibers are then split level with the end 34 of the plug.

Figure 10:
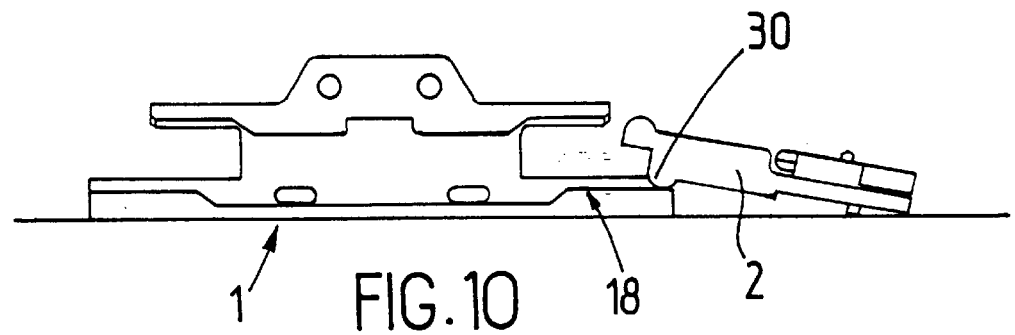
FIGS. 10 to 13, lateral schematic views of the splicing device showing the stages in the introduction of an end plug into the central splicing body.
Figure 11:
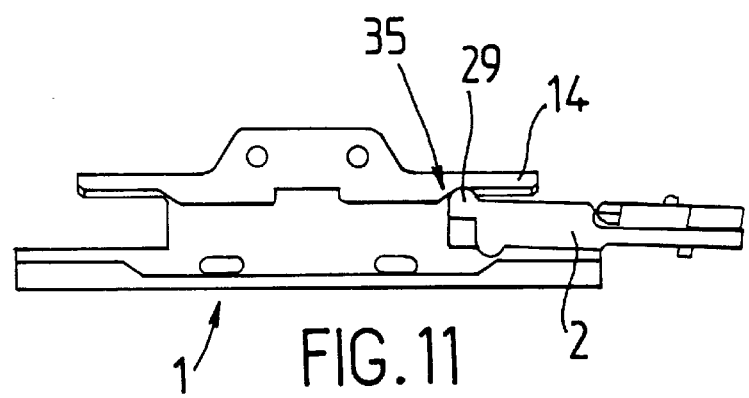
Figure 12:
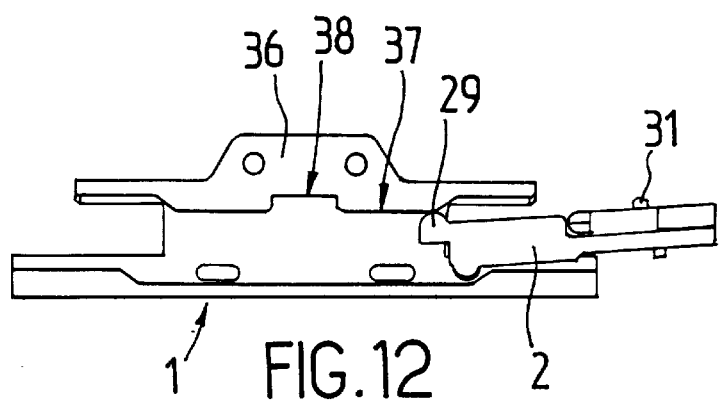
Figure 13:
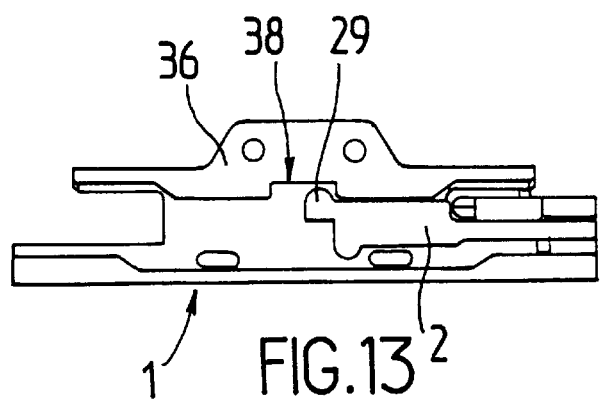

The following operation is to insert each end plug into splicing body 1. These operations are illustrated in FIGS. 10 to 13. First of all, guide members 30 of plug 2 are placed at the entry to rails 18 of splicing body 1 (FIG. 10). Thus positioned, the end plug is moved towards the inside of the splicing body in such a way that rounded portions 29 are inserted beneath horizontal strips 14 (FIG. 11). As a result, the end plug is guided completely. The contact of rounded portion 29 on inclined surface 35 of the splicing body causes the plug to be inclined in relation to the body (FIG. 12) which corresponds to the placing of the bared optical fibers 40 in grooves 19. This flexing of the fibers is maintained over a certain length by the contact of rounded portion 29 beneath the horizontal edge 37 of cap 36 until the said rounded portion comes into place in a central recess 38 provided on the horizontal edge. The optical fibers are thus immobilized in the narrow space between the lower face 3 of the plate and grooves 19 (FIGS. 3b and 12). Lateral bosses 31 of each plug then bend strips 14, the elasticity of which ensures that the plug is locked in the splicing body. At the end of its travel, the end plug comes into abutment against the end faces of vertical wings 11.

The optical fibers of each end plug are thus perfectly aligned, since they are perfectly positioned in their respective grooves.

Cams 13 are then used so that their specially shaped ends 17 exert a pressure on metallic sheets or leaf springs 16 which will lower the plate and deform it so that the bare fibers are clamped in their grooves. The two cams then remain in lowered position so that the splicing body and the end plugs are frictionally held by the pressure of strips 14.

We claim:

1. Multi-channel mechanical splicing device for fiber-optic cables, comprising:

a central splicing body serving to connect in situ two cable end plugs which fit into said central splicing body, wherein the central splicing body is provided with means for guiding and locking the end plugs, as well as with means for positioning bared fibers; and a plate housed inside the central splicing body maneuvered by cams to clamp and hold the bared fibers in said central splicing body; wherein said central splicing body comprises a base plate bordered by two vertical wings, a cap having a substantially trapezoidal profile surmounting the wings, and a tunnel having a flat bottom provided between the wings, where the tunnel accepts said plate in contact with said flat bottom.

2. Splicing device according to claim 1, comprising two cams hinged on two pins passing through two holes pierced in the cap, wherein said cams act, via their specially shaped ends, on metallic sheets or leaf springs placed above the plate.

3. Splicing device according to claim 2, wherein the lower face of the plate is flat, and its upper face curves upwards in its central portion in an area in which the leaf springs are not subjected to the pressure exerted by the cams.

4. Splicing device according to claim 1, comprising two cams hinged on two pins passing through holes pierced in the cap, wherein said cams act, via their specially shaped ends, directly on the upper face of the plate, and said plate is provided with recesses enabling it to bend.

5. Splicing device according to claim 1, wherein the means for guiding and locking the end plugs in the central splicing body comprise rails hollowed out in the lateral parts of the plate, horizontal lateral shoulders provided on the base of the cap, and inclined surfaces on horizontal strips which prolong the cap.

6. Splicing device according to claim 1, wherein the means for positioning the bared fibers in the central splicing body comprise V-shaped grooves hollowed out in the lower, flat part of the tunnel provided between the wings.

7. Mechanical splicing device for fiber-optic cables, comprising:

a central splicing body connecting in situ two cable end plugs which fit into said splicing body, wherein the central body is provided with means for guiding and locking the end plugs, as well as with means for positioning bared fibers;

a plate housed inside the central splicing body maneuvered by cams to clamp and hold the bared fibers in said central body; and wherein each of the end plugs is composed of a lower part and an upper part fixed to one another by a press fit effected between edges of the lower part and cut out portions of the upper part.

8. Splicing device according to claim 7, wherein the upper face of the lower part and the lower face of the upper part have transverse grooves with striations in relief.

9. Splicing device according to claim 7, wherein the lower part defines a horizontal plane, wings on the lower part end in a rounded portion above the horizontal plane, and said wings end in a rounded guide member below the horizontal plane and slightly set back from said rounded portion above the horizontal plane.

10. Splicing device according to claim 7, wherein the upper part bears lateral bosses.

11. Mechanical splicing device for fiber-optic cables, comprising:

a cable end plug for housing bared fibers, wherein said plug comprises a lower part and an upper part fixed to one another by a press fit;

a central splicing body;

a locking element positioned on the central splicing body and configured to engagably connect to said end plug;

at least one guiding member fixed to said central splicing body, wherein said at least one guiding member is adapted to receive and guide said cable end plug;

at least one positioning groove provided on said central splicing body for positioning said bared fibers; and a plate housed inside the central splicing body maneuvered by cams to clamp and hold the bared fibers in said central body.

12. Splicing device according to claim 11, wherein said cams act, via their specially shaped ends, on metallic sheets or leaf springs placed above the plate.

13. Splicing device according to claim 11, wherein said cams act, via their specially shaped ends directly on the upper face of the plate, and said plate is provided with recesses enabling it to bend.

14. Mechanical splicing device for fiber-optic cables, comprising:

a cable end plug for housing bared fibers;

a central splicing body comprising a base plate and two vertical wings forming a flat-bottomed tunnel;

a locking element positioned on the central splicing body configured to engagably connect to said end plug;

at least one guiding member fixed to said central splicing body, wherein said at least one guiding member is adapted to receive and guide said cable end plug;

at least one positioning groove provided on said central splicing body for positioning said bared fibers; and a plate housed inside the central splicing body maneuvered by cams to clamp and hold the bared fibers between said plate and said flat-bottomed tunnel.

15. Splicing device according to claim 14, wherein said central splicing body further comprises a cap having a substantially trapezoidal profile surmounting said two vertical wings, and two cams hinged on two pins passing through two holes pierced in the cap, wherein said cams act, via their specially shaped ends, on metallic sheets or leaf springs placed above the plate.

16. Splicing device according to claim 14, wherein said central splicing body further comprises a cap having a substantially trapezoidal profile surmounting said two vertical wings, and two cams hinged on two pins passing through two holes pierced in the cap, wherein said cams act, via their specially shaped ends, directly on the upper face of the plate, where said plate is provided with recesses enabling it to bend.

17. Splicing device according to claim 14, wherein said central splicing body further comprises a cap having a substantially trapezoidal profile surmounting said two vertical wings, wherein said at least one guiding member comprises rails hollowed out in lateral parts of the plate, and wherein said means for guiding and locking the end plugs comprise horizontal lateral shoulders provided on the base of the cap, and inclined surfaces on horizontal strips which prolong the cap.

18. Splicing device according to claim 14, wherein the at least one groove for positioning the bared fibers in the central splicing body comprise V-shaped grooves hollowed out in the flat-bottomed tunnel formed between the wings.

* * * * *